United States Patent

Mita et al.

[11] Patent Number: 5,966,638
[45] Date of Patent: Oct. 12, 1999

[54] RECEIVING APPARATUS, SIGNAL DEMODULATING METHOD, ANTENNA APPARATUS, RECEIVING SYSTEM AND ANTENNA DIRECTION ADJUSTING METHOD

[75] Inventors: Hiroyuki Mita, Saitama; Tadashi Kajiwara; Toshikazu Ido, both of Kanagawa, all of Japan

[73] Assignee: Sony Corporation, Tokyo, Japan

[21] Appl. No.: 09/184,090

[22] Filed: Oct. 30, 1998

Related U.S. Application Data

[63] Continuation of application No. 08/636,931, Apr. 24, 1996.

[30] Foreign Application Priority Data

Apr. 25, 1995 [JP] Japan .................................. 7-099253

[51] Int. Cl.⁶ ..................................................... H04H 7/00
[52] U.S. Cl. ............................................................. 455/6.3
[58] Field of Search ............................... 455/5.1, 6.2, 6.3, 455/25, 70, 313, 317; 340/825.39; 342/428, 352

[56] References Cited

U.S. PATENT DOCUMENTS

| | | |
|---|---|---|
| 3,766,560 | 10/1973 | Bornhorst et al. ...................... 342/428 |
| 5,214,793 | 5/1993 | Conway et al. .................... 340/825.39 |
| 5,594,937 | 1/1997 | Stiles et al. .............................. 455/6.3 |

*Primary Examiner*—William Oen
*Attorney, Agent, or Firm*—Frommer Lawrence & Haug, LLP.; William S. Frommer

[57] ABSTRACT

An SHF-band receiving apparatus is used for demodulating a signal received by an antenna and input through a cable by using an indoor receiving unit which comprises: demodulation means for demodulating an input signal supplied thereto through the cable; detection means for detecting a detection signal representing the direction of the antenna from a demodulated signal output by the demodulation means; and output means for generating a modulated signal for displaying information on the direction of the antenna by modulation of a carrier signal based on the detection signal produced by the detection means and for outputting the modulated signal through the cable to the antenna side.

14 Claims, 6 Drawing Sheets

RECEIVING APPARATUS, SIGNAL DEMODULATING METHOD, ANTENNA APPARATUS, RECEIVING SYSTEM AND ANTENNA DIRECTION ADJUSTING METHOD

This is a continuation of application Ser. No. 08/636,931 filed Apr. 24, 1996.

BACKGROUND OF THE INVENTION

1. Field of the Invention

In general, the present invention relates to a receiving apparatus, a signal demodulating method, an antenna apparatus, a receiving system and an antenna direction adjusting method. In particular, the present invention relates to a receiving apparatus, a signal demodulating method, an antenna apparatus, a receiving system and an antenna direction adjusting method which are appropriate for adjusting the direction of an antenna for receiving radio waves broadcasted through satellites.

2. Description of Related Art

In recent years, a system for receiving radio waves broadcasted through communication and broadcasting satellites is becoming popular. In such a system, it is necessary to adjust the direction of an antenna thereof so that radio waves transmitted by the satellites can be received by the antenna correctly.

An invention relating to the adjustment of such an antenna is disclosed in Japanese Patent Publication No. Sho59-47883.

To be more specific, according to the disclosed invention cited above, radio waves transmitted by a satellite 1 are received by a parabola antenna 11 as shown in FIG. 5. A signal resulting from the reception of a radio wave by the parabola antenna 11 is converted into a signal having a predetermined intermediate frequency by an outdoor converter unit 12. The signal having the predetermined intermediate frequency is then supplied to an indoor converter unit 31 installed under the roof 21 of a house through a cable 15. The indoor converter unit 31 demodulates the intermediate frequency signal, outputting the result of the demodulation to a television receiver 32.

The direction of the parabola antenna 11 is adjusted by adjustment of a direction adjusting unit 13 so as to make the parabola antenna 11 correctly oriented toward the satellite 1. A meter 14, which allows an antenna adjusting person to know whether or not the parabola antenna 11 is correctly oriented toward the satellite 1 with ease, is provided on the outdoor converter unit 12.

The meter 14 works as follows. As is shown in FIG. 6, in the outdoor converter 12, a band pass filter (BPF) 41 extracts signals in a predetermined frequency band from a signal received by the parabola antenna 11. A signal output by the BPF 41 is then amplified by an amplifier 42 before being supplied to a frequency converter 43 for converting the signal into an output signal having a predetermined intermediate frequency which output signal is called an IF signal. The IF signal output by the frequency converter 43 is amplified by an intermediate frequency amplifier 44. A signal output by the intermediate frequency amplifier 44 is supplied to a signal splitting circuit 45 for transmitting the signal to the indoor converter unit 31 through a cable 15.

Part of the IF signal output by the intermediate frequency amplifier 44 is supplied to a detecting circuit 46 by the signal splitting circuit 45. Detecting the IF signal, the detecting circuit 46 outputs a direct current signal representing the level of the IF signal. The direct current signal output by the detecting circuit 46 is amplified by a direct current amplifier 47 before being supplied to the meter 14.

As a result, the level of the IF signal is displayed on the meter 14. While watching the display on the meter 14, the person adjusting the direction of the parabola antenna 11 makes the parabola antenna 11 oriented in such a direction toward the satellite 1 that the level of the IF signal is maximized.

By providing the meter 14 on the outdoor converter unit 12 as described above, the person adjusting the direction of the parabola antenna 11 can carry out adjustment so as to make the parabola antenna 11 oriented in a correct direction toward the satellite 1 by himself or herself with ease.

In such a conventional apparatus, however, the level of the IF signal is monitored at the outdoor converter unit 12, giving rise to a problem that the configuration of the outdoor converter unit 12 becomes complex and, thus, the price thereof becomes expensive.

On the top of that, since the level of the IF signal is monitored, it is impossible to identify which satellite is generating the radio wave being monitored in the case of a plurality of satellites 1 existing. As a result, it is feared that the adjustment causes the parabola antenna 11 to be oriented toward a wrong satellite by mistake.

SUMMARY OF THE INVENTION

The present invention addresses the problems described above. It is an object of the present invention to provide low-priced receiving and antenna apparatuses and a low-priced receiving system each having a simple configuration. It is another object of the present invention to provide receiving and antenna apparatuses and a receiving system that are capable of making a parabola antenna oriented toward a predetermined satellite among a plurality of existing satellites.

A receiving apparatus according to claim 1 to be described later is characterized in that the receiving apparatus comprises: demodulation means for demodulating a signal supplied thereto through a cable; detection means for detecting a signal representing the direction of an antenna from the output of the demodulation means; and output means for generating a signal conveying information on the direction of the antenna from a detection result produced by the detection means and for outputting the signal through the cable.

A signal demodulating method according to claim 8 to be described later is characterized in that the signal demodulating method comprises the steps of: demodulating a signal supplied through a cable; detecting a signal representing the direction of an antenna from a signal resulting from the demodulation; and outputting a signal representing a result of the detection through the cable.

An antenna apparatus according to claim 9 to be described later comprises: extraction means for extracting a signal representing the direction of an antenna which signal is supplied by a receiving apparatus through a cable; and display means for outputting a predetermined message corresponding to the signal extracted by the extraction means.

An antenna adjusting method according to claim 13 to be described later comprises the steps of: extracting a signal representing the direction of an antenna which signal is supplied by a receiving apparatus through a cable; and detecting the extracted signal and outputting a predetermined message corresponding to the detected signal.

A receiving system according to claim 14 to be described later comprises: demodulation means for demodulating a signal supplied thereto through a cable; detection means for detecting a signal representing the direction of an antenna from the output of the demodulation means; output means for generating a signal conveying information on the direction of the antenna from a detection result produced by the detection means and for outputting the signal through the cable; extraction means for extracting a signal representing the direction of an antenna which signal is supplied by a receiving apparatus through the cable; and display means for outputting a predetermined message corresponding to the signal extracted by the extraction means.

An antenna direction adjusting method according to claim 15 to be described later is characterized in that the antenna direction adjusting method comprises the steps of: detecting a signal representing the direction of an antenna out off a demodulated signal resulting from demodulation of a signal supplied from an antenna through a cable; outputting a signal representing a result of the detection from a receiving apparatus through the cable; extracting a signal representing the direction of an antenna which signal is supplied by the receiving apparatus through the cable; and outputting a predetermined message corresponding to the extracted signal.

In the receiving apparatus according to claim 1 to be described later, the demodulation means demodulate a signal supplied thereto through a cable; the detection means detect a signal representing the direction of an antenna from the output of the demodulation means; and the output means generate a signal conveying information on the direction of the antenna from a detection result produced by the detection means and output the signal through the cable.

The signal demodulating method according to claim 8 to be described later comprises the steps of: demodulating a signal supplied through a cable; detecting a signal representing the direction of an antenna from a signal resulting from the demodulation; and outputting a signal representing a result of the detection through the cable.

In the antenna apparatus according to claim 9 to be described later, the extraction means extract a signal representing the direction of an antenna which signal is supplied by a receiving apparatus through a cable; and the display means output a predetermined message corresponding to the signal extracted by the extraction means.

The antenna adjusting method according to claim 13 to be described later comprises the steps of: extracting a signal representing the direction of an antenna which signal is supplied by a receiving apparatus through a cable; detecting the extracted signal; and outputting a predetermined message corresponding to the detected signal.

In the receiving system according to claim 14 to be described later, the demodulation means demodulate a signal supplied thereto through a cable; the detection means detect a signal representing the direction of an antenna from the output of the demodulation means; the output means generate a signal conveying information on the direction of the antenna from a detection result produced by the detection means and output the signal through the cable; the extraction means extract a signal representing the direction of an antenna which signal is supplied by a receiving apparatus through the cable; and the display means output a predetermined message corresponding to the signal extracted by the extraction means.

The antenna direction adjusting method according to claim 15 to be described later comprises the steps of: detecting a signal representing the direction of an antenna out off a demodulated signal resulting from demodulation of a signal supplied from an antenna through a cable; outputting a signal representing a result of the detection from a receiving apparatus through the cable; extracting a signal representing the direction of an antenna which signal is supplied by the receiving apparatus through the cable; and outputting a predetermined message corresponding to the extracted signal.

DETAILED DESCRIPTION OF THE PREFERRED EMBODIMENTS

The present invention will become apparent from the following detailed description of preferred embodiments with reference to accompanying diagrams.

Figure 1:
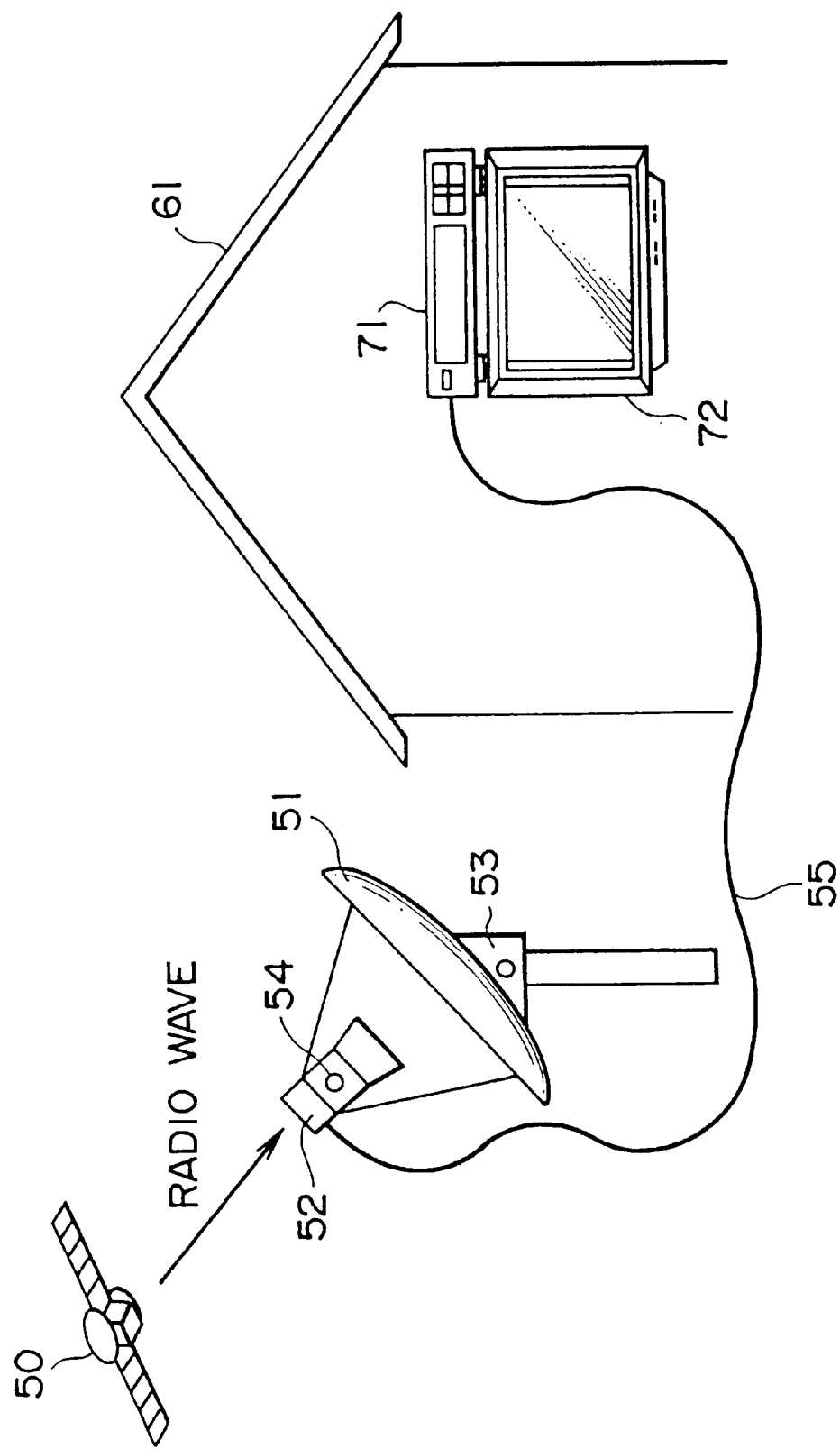
FIG. 1 is a block diagram showing a typical configuration of a receiving apparatus provided by the present invention.

FIG. 1 is a block diagram showing a typical configuration of a receiving apparatus provided by the present invention. In this embodiment, radio waves transmitted through a satellite 50 are received by a parabola antenna 51. The parabola antenna 51 is supported by a holding base 53 which allows the parabola antenna 51 to be oriented in any arbitrary direction and to be fixed at a position in the oriented direction. The parabola antenna 51 includes a converter 52 for converting a received signal into a signal having an intermediate frequency which signal is called an IF signal. The IF signal is output through an IF cable 55. In addition, an LED 54 is provided on the converter 52.

A signal output by the parabola antenna 51, which is installed outside the roof 61 of a house, is supplied to an indoor receiver 71 installed under the roof 61 through the IF cable 55. A signal output by the indoor receiver 71 is then fed to a television receiver 72.

Figure 2:
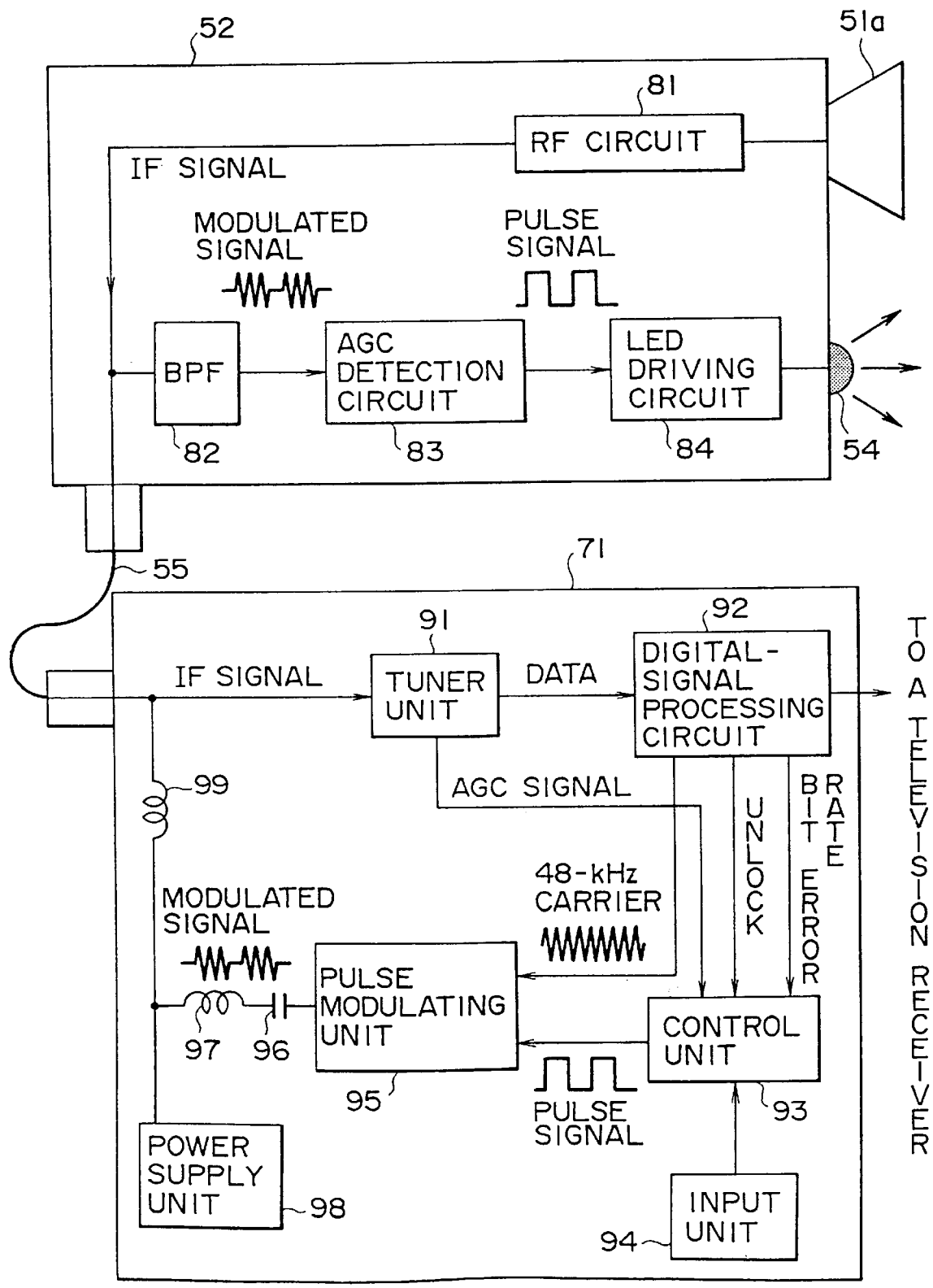
FIG. 2 is a block diagram showing typical configurations of a converter 52 and a receiver 71 shown in FIG. 1.
Figure 6:
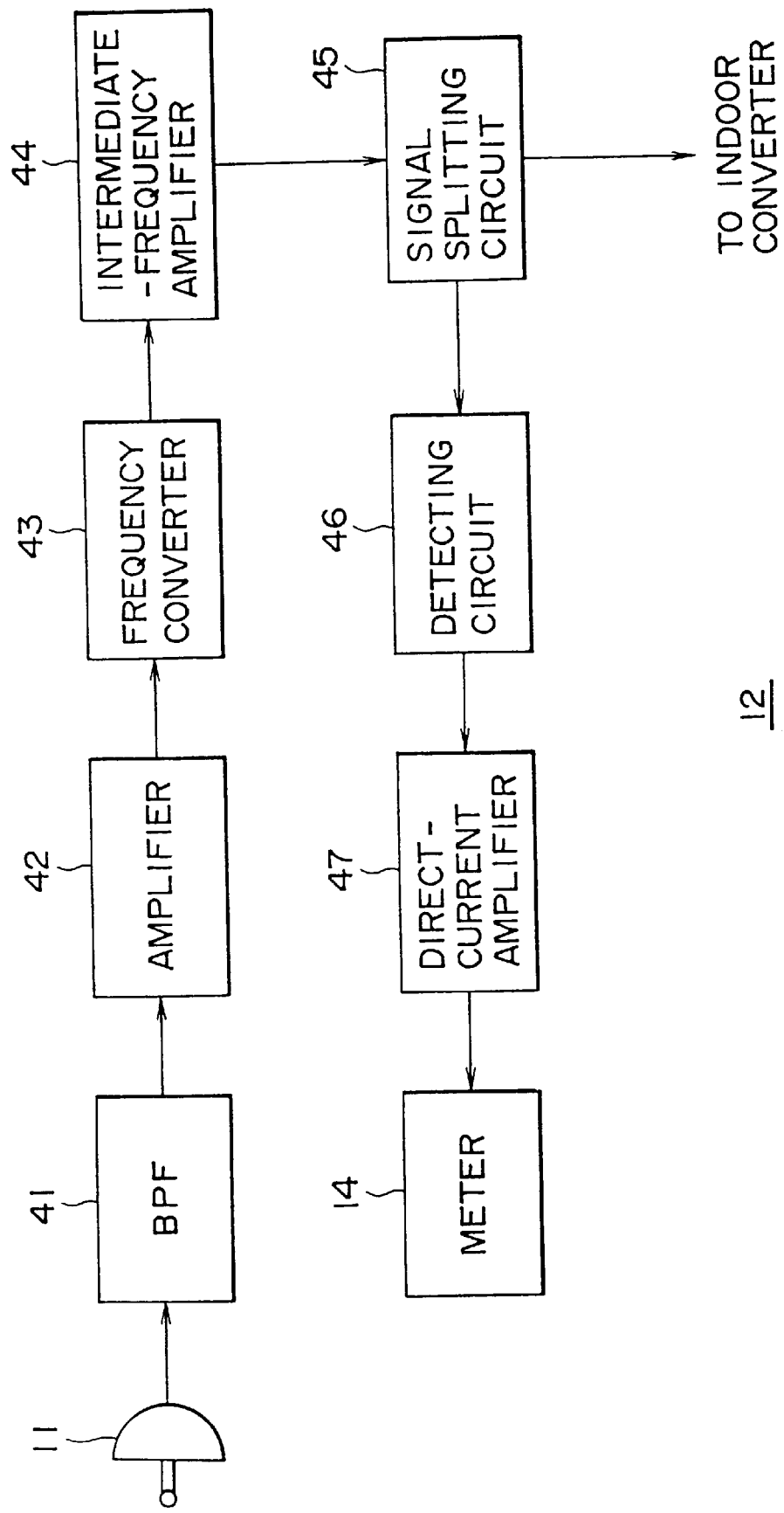
FIG. 6 is a block diagram showing a typical configuration of an outdoor converter unit 12 shown in FIG. 5.

FIG. 2 is a block diagram showing more detailed typical configurations of the converter 52 and the receiver 71. In the converter 52, a signal taken in by a primary horn 51a of the parabola antenna 51 is supplied to an RF circuit 81. Comprising a band pass filter 41 shown in FIG. 6, an amplifier 42, a frequency converter 43 and an intermediate frequency amplifier 44, the RF circuit 81 converts the frequency of a signal received from the satellite 50 into an intermediate frequency, that is, converts the signal into an IF signal which is then output to the receiver 71 through the IF cable 55.

In addition, the converter 52 also includes a band pass filter (BPF) 82 which serves as a detection means. The band pass filter 82 does not extract the IF signal output by the RF circuit 81 though. Instead, the band pass filter 82 extracts a component with a frequency of 48 kHz output by a pulse modulating unit 95 of the receiver 71 to be described later. Having frequencies in the range 950 MHz to 1,770 MHz, the IF signal is a signal of a band of about 1 GHz. Thus, the band pass filter 82 can separate the IF signal transmitted by the RF circuit 81 to the IF cable 55 from a signal transmitted from the pulse modulating unit 95 to the IF cable 55 with ease.

A signal output by the band pass filter 82 is supplied to an AGC detection circuit 83 to undergo detection. A detected signal output by the AGC detection circuit 83 is fed to an LED driving circuit 84, driving the LED 54 which is used as a display means.

In the receiver 71, on the other hand, a tuner unit 91 which serves as a demodulation means demodulate the IF signal supplied from the IF cable 55. Data resulting from the demodulation is output to a signal processing unit 92 which is part of the demodulation means. The signal processing unit 92 processes digital video and audio data fed thereto, converting the data into analog signals by using a clock signal with a predetermined frequency. A signal completing the processing at the signal processing unit 92 is output to the television receiver 72.

The tuner unit 91 demodulates the IF signal as is described above, outputting an AGC signal resulting from the demodulation to a control unit 93. The signal processing unit 92 corrects errors of the digital data and if necessary compensates the output signal for the errors. Information on a bit error rate obtained at that time is also output to the control unit 93. The control unit 93 monitors the direction of the parabola antenna 51 by using at least one of the AGC signal received from the tuner unit 91 and the bit error rate signal supplied by the signal processing unit 92.

To put it in detail, the level of the AGC signal with the parabola antenna 51 correctly oriented toward the satellite 50 is different from the level of the AGC signal with the parabola antenna 51 not correctly oriented toward the satellite 50. Likewise, the bit error rate is low when the parabola antenna 51 is correctly oriented toward the satellite 50 and the bit error rate increases when the parabola antenna 51 is not correctly oriented toward the satellite 50. Accordingly, the control unit 93 can detect the direction in which the parabola antenna 51 is oriented toward the satellite 50 from these signals.

In addition, the control unit 93 can input predetermined commands which are generated by operating keys or buttons of an input unit 94 or operating a remote commander not shown in the figure.

A clock signal having a frequency of 48 kHz is supplied to the pulse modulating unit 95 by the digital signal processing circuit 92. The clock signal is used by the digital signal processing circuit 92 for converting digital audio data into an analog signal. In addition, a pulse signal representing a direction in which the parabola antenna 51 is oriented is also supplied by using the control unit 93 to the pulse modulating unit 95. The pulse modulating unit 95 which also serves as an output means carries out pulse modulation on the clock carrier signal with a frequency of 48 kHz supplied by the digital signal processing circuit 92 using the pulse signal supplied by the control unit 93, outputting a modulated signal resulting from the pulse modulation.

A power supply unit 98 supplies a necessary power-supply voltage to the circuits employed. in the converter 52 through a coil 99 and the IF cable 55. The coil 99 is inserted therein for passing on the direct current voltages supplied by the power supply unit 98 to the converter 52 through the IF cable 55 and for preventing the IF signal supplied by the converter 52 to the tuner unit 91 through the IF cable 55 from being fed to the power supply unit 98.

The modulated signal output by the pulse modulating unit 95 is supplied to the converter 52 through a condenser 96, a coil 97 and the path for supplying the direct current voltage of the power supply unit 98 to the converter 52 which path comprises the coil 99 and the IF cable 55. The condenser 96 is used for preventing the direct current voltage output by the power supply unit 98 from being supplied to the pulse modulating unit 95 whereas the coil 97 is used for eliminating noise.

Next, operations of the antenna and receiving apparatuses are explained. First of all, the person adjusting the direction of the parabola antenna 51 operates the input unit 94 to request tile control unit 93 that a signal of a predetermined channel be received. Receiving the request, the control unit 93 controls the tuner unit 91 so as to execute an operation to receive a signal of the requested channel.

The parabola antenna 51 receives a radio wave transmitted from the satellite 50 and the RF circuit 81 converts the received radio wave into an IF signal having a predetermined intermediate frequency, outputting the IF signal to the tuner unit 91 of the receiver 71 through the IF cable 55. The tuner unit 91 demodulates the IF signal supplied thereto and outputs digital video and audio data resulting from the demodulation to the digital signal processing circuit 92.

The digital signal processing circuit 92 extracts the bit error rate of the digital data supplied thereto, outputting the bit error rate to the control unit 93. In addition, by operating the input unit 94, a reception site (that is, a place where the receiver 71 is installed), the intensity of electric waves transmitted by the satellite (that is, the EIRP: Equivalent Isotropically Radiated Power) and the antenna's mouth diameter (that is, the performance index or the GT ratio) are input to the control unit 93 in advance. The control unit 93 calculates an expected maximum reception CN ratio from the data input in advance. If the expected maximum reception CN ratio is found greater than a first reference value set in advance, a high CN ratio mode is set. If the expected maximum reception CN ratio is found smaller than a second reference value which is smaller than the first reference value, a low CN ratio mode is set. If the expected maximum reception CN ratio is between the first and second reference values, a standard CN ratio mode is set.

As an alternative, a predetermined mode can be input manually from the input unit 94.

Figure 3:
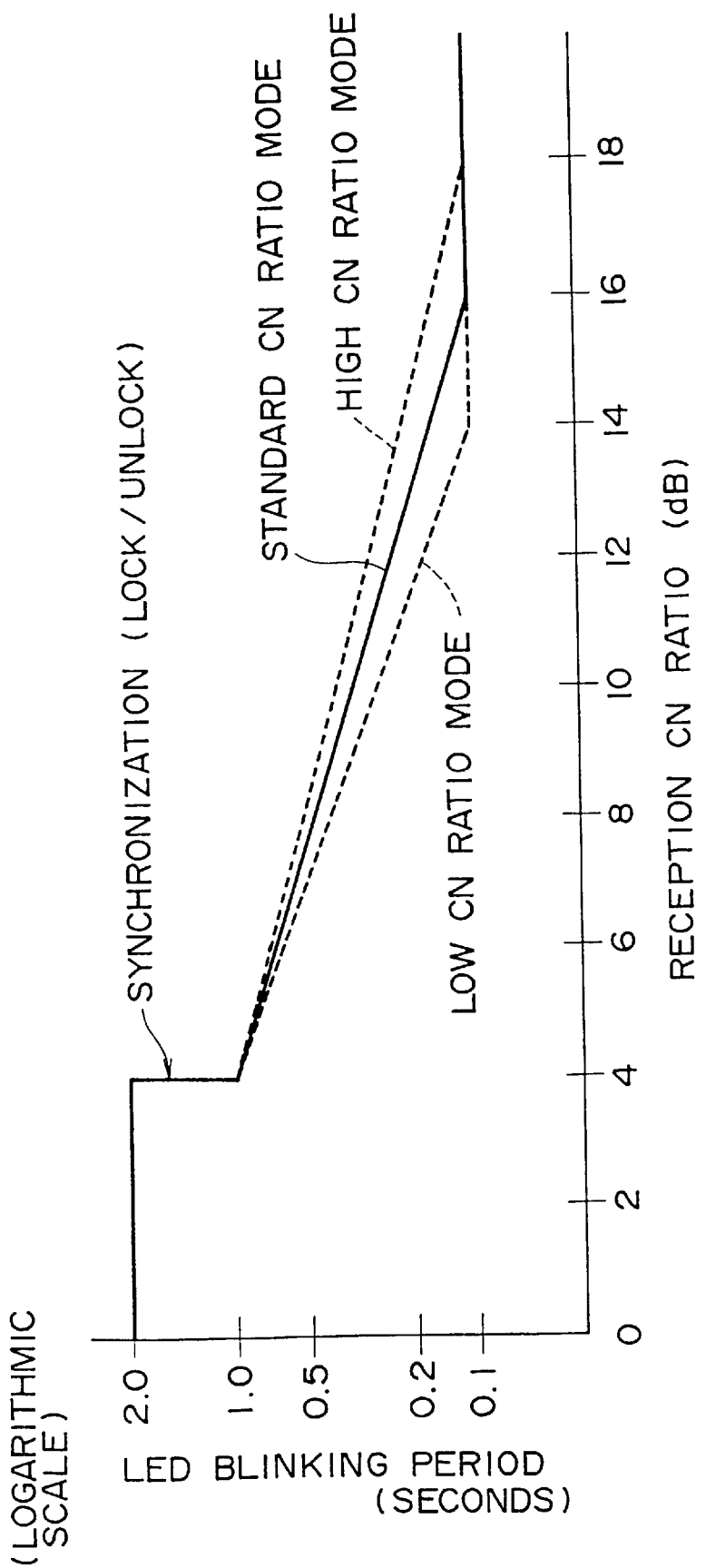
FIG. 3 is a diagram showing relations between the reception CN ratio and the blinking period of an LED.

Based on the set mode, the control unit 93 finds a CN ratio representing a bit error rate and determines the blinking period of the LED in accordance with the CN ratio. That is to say, the relation between the reception CN ratio and the blinking period of the LED varies depending upon whether the set mode is the high, low or standard CN ratio mode as shown in FIG. 3. For the same reception CN ratio or the same bit error rate, the blinking period of the LED 54 in the high CN ratio mode is set at a value greater than that in the low CN ratio mode. The blinking period in the standard CN ratio mode is set at intermediate values between those in the high and low CN ratio modes.

The blinking period is set at a value that varies logarithmically with the reception CN ratio. By setting the blinking period at such a value, it is easy to identify the maximum point of the signal level due to characteristics of the sense of sight belonging to a human being, that is, the person who is adjusting the parabola antenna 51.

As shown in FIG. 3, the horizontal axis represents the reception CN ratio (dB). It should be noted, however, that the horizontal axis can represent the bit error rate directly.

As described above, for an obtained bit error rate, the control unit 93 finds a reception CN ratio and further determines a blinking period corresponding to the reception CN ratio. Then, a pulse signal corresponding to the blinking ratio is output to the pulse modulating unit 95.

The pulse modulating unit 95 carries out pulse modulation on the clock carrier signal with a frequency of 48 kHz supplied by the digital signal processing circuit 92 by using the pulse signal fed by the control unit 93, outputting a signal resulting from the pulse modulation. To put it in more detail, the modulated signal output by the pulse modulating unit 95 is the clock carrier signal itself with a frequency of 48 kHz during the turned-on period of the LED 54 and is nothing during the turned-off period of the LED 54. The modulated signal is supplied to the converter 52 through the condenser 96, the coils 97 and 99 and the IF cable 55.

In the converter 52, the modulated signal component is extracted by means of the band pass filter 82 and supplied to the detection circuit 83. The detection circuit 83 converts the modulated signal supplied by the band pass filter 82 into the original pulse signal which is then fed to the LED driving circuit 84. The LED driving circuit 84 drives the LED 54 in accordance with the pulse signal supplied by the detection circuit 83. To put it in detail, during a period in which the carrier signal with a frequency of 48 kHz exists, the LED 54 is turned on and, during a period in which the carrier signal with a frequency of 48 kHz does not exist, the LED 54 is turned off as is described above.

The more the parabola antenna 51 is correctly oriented toward the satellite 50, the greater the value of the reception CN ratio and, thus, the smaller the bit error rate and, as a result, the shorter the blinking period of the LED 54 as is shown in FIG. 3. Accordingly, the person adjusting the parabola antenna 51 adjusts the direction thereof so that the blinking period of the LED 54 becomes shortest. In the case of the embodiment shown in FIG. 3, the direction of the parabola antenna 51 is adjusted so as to result in a blinking period of 0.2 seconds.

Since the LED 54 is attached to the converter 52, the person adjusting the parabola antenna 51 can adjust the orientation thereof to the correct direction by himself or herself without monitoring the display state of the television receiver 72.

It should be noted that, in order to obtain a bit error rate, it is necessary for the digital data in the digital signal processing circuit 92 to be in a lock state, a state of being synchronized with the clock signal. In the case of the embodiment shown in FIG. 3, when the value of the reception CN ratio is smaller than 4 dB, the digital data is in an unlock state, making it impossible to obtain a bit error rate. As a result, the direction of the parabola antenna 51 can not be adjusted. That is to say, when the direction of the parabola antenna 51 deviates from the correct orientation toward the satellite 50 by an angle equal to or greater than a predetermined value, the direction to which the parabola antenna 51 should be adjusted becomes unclear.

In order to solve the above problem, in the case of the present embodiment, the AGC signal which is obtained when the tuner unit 91 demodulates the IF signal is also supplied to the control unit 93. When an unlock signal is supplied from the digital signal processing circuit 92, the control unit 93 generates a pulse signal with the AGC signal taken as a reference in place of the bit error rate. Since the level of the AGC signal also varies depending upon the reception site, the EIRP and the GT ratio, also in this case, the control unit 93 sets the blinking period of the LED 54 depending upon the mode as is the case with that shown in FIG. 3. As a result, also in this case, the person adjusting the parabola antenna 51 can adjust the direction thereof so as to make the blinking period of the LED 54 shortest.

It should be noted that, of course, the parabola antenna 51 can be oriented in the correct direction toward the satellite 50 by using the AGC signal only without resorting to the information on the bit error rate.

When the bit error rate is used, a bit error rate for a reception state of a predetermined channel specified by a command entered by operating the input unit 94 is obtained. As a result, even in the case of a plurality of satellites existing, the parabola antenna 51 can be prevented from being oriented toward a wrong satellite by mistake.

On the top of that, since the direction of the parabola antenna 51 is evaluated in the receiver 71 by using the control unit 93 employed in the receiver 71, it is possible to carry out finer adjustment of the direction in addition to the adjustment in each mode like the one shown in FIG. 3.

In the case of a control unit 93 employing a CPU, a program to be executed by the CPU prescribes in advance ways in which the direction is to be evaluated by the control unit 93.

It should be noted that, in the present embodiment shown in FIG. 3, the blinking period of the LED is fixed at 2.0 seconds for values of the reception CN ratio equal to or smaller than 4 dB. As a result, in the adjustment based on the bit error rate, the LED 54 is blinking at a period of 2.0 seconds when the parabola antenna 51 is not receiving a radio wave from the satellite 50 or, even if the parabola antenna 51 is receiving a radio wave from the satellite 50 which radio wave has a very low level. As a radio wave is received from the satellite 50 at a certain level or higher levels, the blinking period decreases gradually. When a radio wave is received from the satellite 50 at a predetermined level, the blinking period decreases to 0.1 sec.

When the adjustment of the direction of the parabola antenna 51 is completed, a command to end the adjustment is entered by operating the input unit 94. At that time, the control unit 93 halts the supplying of the pulse signal to the pulse modulating unit 95. As a result, the LED 54 is put in a turned-off state.

As described above, in the case of the present embodiment, the person adjusting the antenna is informed of the direction in which the parabola antenna is oriented by means of the blinking period of the LED 54. It should be noted that it is also possible to notify the person adjusting the antenna of the direction in which the parabola antenna 51 is oriented toward the satellite by means of, among other things, the volume or the generation period of sound output by a buzzer or the like.

Figure 4:
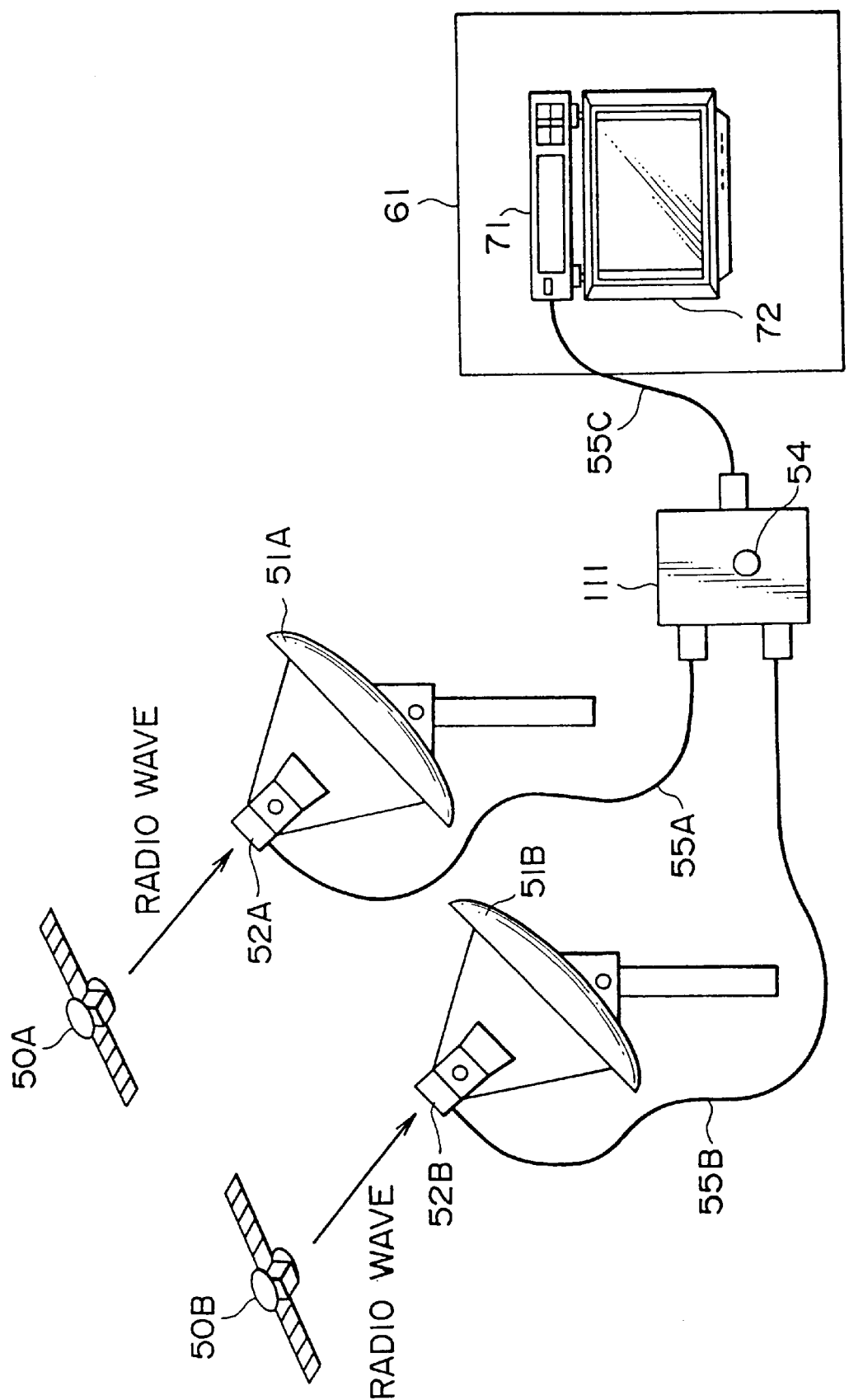
FIG. 4 is a block diagram showing another typical configuration of the receiving apparatus provided by the present invention.
Figure 5:
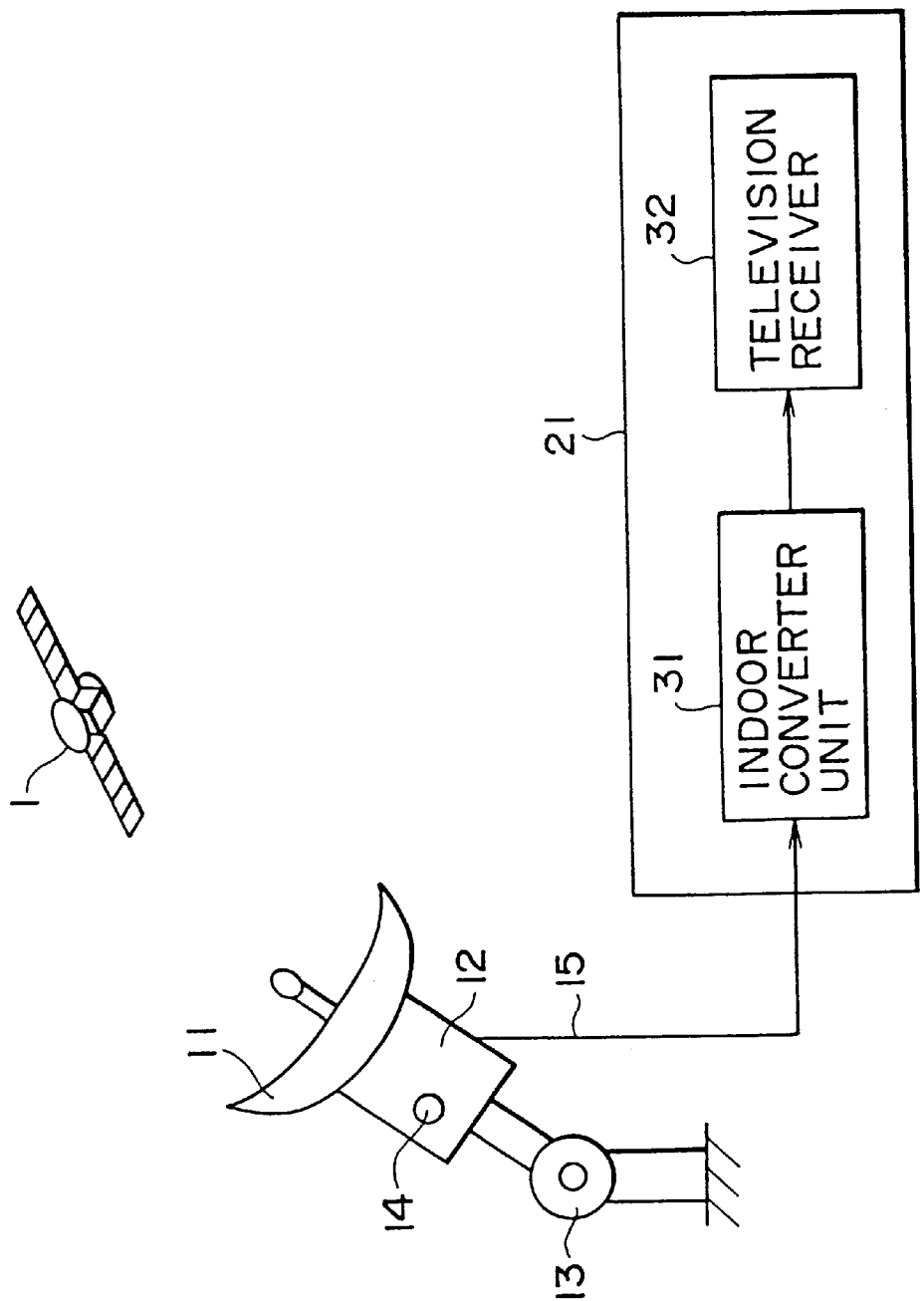
FIG. 5 is a block diagram showing a typical configuration of the conventional receiving apparatus.

Another embodiment is shown in FIG. 4. In the case of the present embodiment, the receiver 71 is designed so that the receiver 71 can demodulate a plurality of system signals. To be more specific, the receiver 71 can demodulate signals transmitted through satellites 50A and 50B. In this case, parabola antennas 51A and 51B are oriented toward the satellites 50A and 50B respectively.

A signal output by a converter 52A of the parabola antenna 51A is supplied to one of input terminals of a signal switcher 111 through an IF cable 55A while a signal output by a converter 52B of the parabola antenna 51B is fed to another input terminal of the signal switcher 111 through an IF cable 55B. The signal switcher 111 is used for selecting either the signal received through the IF cable 55A or 55B and passing on the selected signal to the receiver 71 through an IF cable 55C. The LED 54 (strictly speaking, as well as the band pass filter 82, the detection circuit 83 and the driving circuit 84 shown in FIG. 2) are provided on the signal switcher 111 which is installed outside the house at a location in close proximity to the parabola antennas 51A and 51B so that the LED 54 can be seen by the person adjusting the antenna.

In the case of the present embodiment, a command is entered by operating the input unit 94, for example, in order to request that a signal of a channel transmitted through the satellite 50A be received by the tuner unit 91. The parabola antenna 51A is then adjusted to such a direction that the blinking period of the LED 54 is minimized as is the case with the embodiment described previously.

Next, a command is entered by operating the input unit 94 now in order to request that a signal of a channel transmitted through the satellite 50B be received by the tuner unit 91. The parabola antenna 51B is then adjusted to such a direction that the blinking period of the LED 54 is minimized as is the case with the parabola antenna 51A.

In the case of the present embodiment, the receiver 71 has a pair of tuner units 91 and a pair of digital signal processing circuits 92 shown in FIG. 2. To be more specific, the receiver 71 has a tuner unit 91A and a digital signal processing circuit 92A for receiving a signal transmitted from the satellite 50A and a tuner unit 91B and a digital signal processing circuit 92B for receiving a signal transmitted from the satellite 50B.

Since the direction of the parabola antenna 51A is adjusted by using the bit error rate and the AGC signal which are obtained when the tuner unit 91A demodulates a signal transmitted by the satellite 50A of a system associated with the parabola antenna 51A and the direction of the parabola antenna 51B is adjusted by using the bit error rate and the AGC signal which are obtained when the tuner unit 91B demodulates a signal transmitted by the satellite 50B of a system associated with the parabola antenna 51B, the parabola antenna 51A will never be oriented toward the satellite 503 pertaining to the system associated with the parabola antenna 51B and, likewise, the parabola antenna 51B will never be oriented toward the satellite 50A pertaining to the system associated with the parabola antenna 51A.

In the embodiments described above, the parabola antenna 51 is made oriented toward the satellite 50. It should be noted, however, that the present invention can also be applied to a case in which the antenna is made oriented toward an antenna on the transmitter side which transmitter is installed on the ground.

In a receiving apparatus and a signal demodulating method according to the present invention, a signal supplied through a cable is demodulated; a signal indicating the direction of an antenna is detected from a demodulated signal resulting from the demodulation; and the detected signal is output through the cable, resulting in an apparatus with a simple configuration and a low cost. On the top of that, the direction of the antenna can be adjusted by one person without help from others. In addition, even in the case of electrical waves transmitted by a plurality of sources from different directions, the antenna can be prevented from being oriented in a wrong direction by mistake and fine adjustment can also be carried out at a low cost.

In an antenna apparatus and an antenna direction adjusting method according to the present invention, a signal representing the direction of an antenna supplied by a receiving apparatus through a cable is extracted and a predetermined message is displayed in accordance with the extracted signal so that the configuration of the antenna apparatus can be simplified and the direction of the antenna can thus be adjusted at a reduced cost.

In a receiving system and an antenna direction adjusting method according to the present invention, a signal indicating the direction of an antenna is detected from a signal demodulated by a receiving apparatus; a signal representing a result of the detection is output through a cable by the receiving apparatus; this signal is extracted; and a predetermined message is output in accordance with the extracted signal, so that, in the case of radio waves transmitted by a plurality of sources from different directions, antennas can each be oriented in the right direction. On the top of that, instead of a binary indicator whereby a message is output if the antenna is oriented in the correct direction and no message is output if the antenna is not oriented in the correct direction, a more detailed message can be output in accordance with the present direction of the antenna. As a result, it is possible to adjust the direction of the antenna at a high speed and with a high degree of reliability.

What is claimed is:

1. An SHF-band receiving apparatus for demodulating an SHF-band signal comprises:

antenna means having an outdoor converter;

a signal cable for supplying a signal from said converter;

an indoor unit for receiving a signal from said converter having;

demodulating means for demodulating a signal from the converter, detection means for detecting a detection signal representative the direction of said antenna from a demodulated signal of said demodulating means;

modulating means for modulating said detection signal with a carrier signal, and output means for supplying a signal from said modulating means to said antenna through said signal cable, and for displaying information of the antenna direction at the output-end of said signal cable.

2. An SHF-band receiving apparatus according to claim 1 wherein said detection means detect the level of said input signal supplied through said cable.

3. An SHF-band receiving apparatus according to claim 1 wherein said detection means detect an error rate of said demodulated signal output by said demodulation means.

4. An SHF-band receiving apparatus according to claim 1 wherein said antenna is a parabola antenna and an outdoor converter is provided for modulating a signal transmitted by a satellite into an IF signal having a predetermined intermediate frequency and for outputting said IF signal.

5. An SHF-band receiving apparatus according to claim 1, wherein said modulating means modulates said carrier signal having a predetermined frequency required in a demodulation process of said input signal carried out by said demodulating means.

6. An SHF-band receiving apparatus according to claim 5 wherein said carrier signal having said predetermined frequency required in said demodulation process of said input signal carried out by said demodulation means is a clock signal used in a D/A conversion process of digital audio data included in said signal received by said antenna.

7. An SHF-band receiving apparatus according to claim 1 wherein said modulated signal generated and output by said output means varies a frequency at which said information on the direction of said antenna is displayed.

8. A method for displaying information of the antenna direction in a satellite broadcast receiving system comprising an antenna having an outdoor converter, a signal cable for supplying a signal from said converter, an indoor unit for receiving a signal from said converter through the signal cable, said method comprising the steps of:

demodulating, at the indoor unit, an input signal from said converter;

detecting, from a demodulated signal at the indoor unit, a detection signal representative of the direction of said antenna;

modulating, at the indoor unit, said detection signal with a carrier signal;

supplying, at the indoor unit, a modulated signal to said antenna through said signal cable; and displaying, at the antenna, information indicative of the antenna direction in response to a supplied modulated signal.

9. The method according to claim 8, wherein said detecting step detects a level of the signal from said converter.

10. The method according to claim 8, wherein said detecting step detects an error rate of said demodulated signal.

11. The method according to claim 8, wherein said antenna is a parabola antenna and the outdoor converter is provided for modulating a signal transmitted by a satellite into an IF signal having a predetermined intermediate frequency and for outputting said IF signal.

12. The method according to claim 8, wherein said carrier signal has a predetermined frequency required in demodulating said input signal.

13. The method according to claim 12, wherein said carrier signal is a clock signal used in D/A conversion of digital audio data included in said signal transmitted by a satellite.

14. The method according to claim 8, wherein said modulated signal varies a frequency at which said information on the direction of said antenna is displayed.

\* \* \* \* \*